Figure 1:
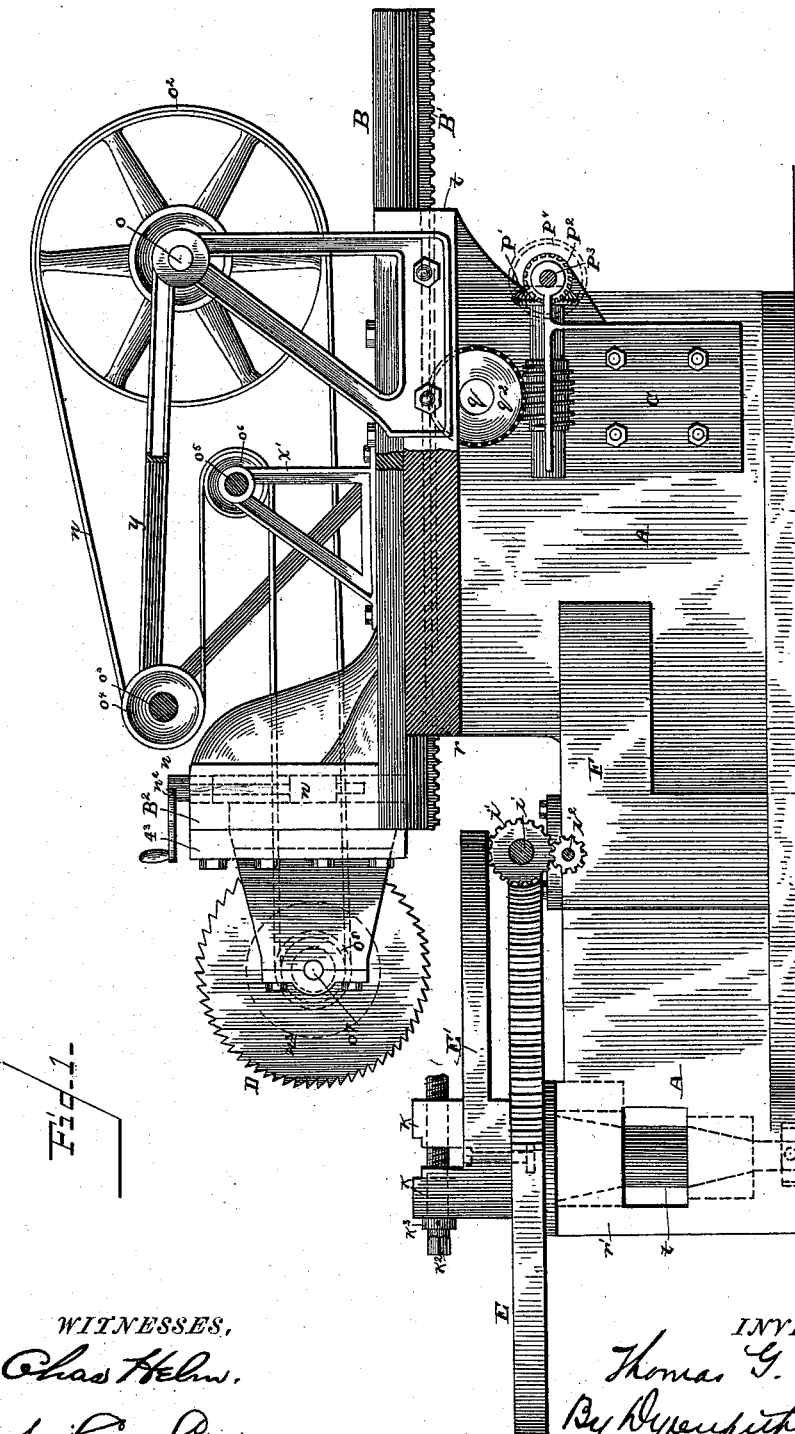

(No Model.) 3 Sheets—Sheet 1.

T. G. PERKINS.
MACHINE FOR CUTTING RAILS.

No. 400,707. Patented Apr. 2, 1889.

WITNESSES,
Chas Helm.
A. Lee Lowe.

INVENTOR.
Thomas G. Perkins,
By Dyrenforth & Dyrenforth
Attorneys.

(No Model.)  3 Sheets—Sheet 2.
T. G. PERKINS.
MACHINE FOR CUTTING RAILS.
No. 400,707. Patented Apr. 2, 1889.
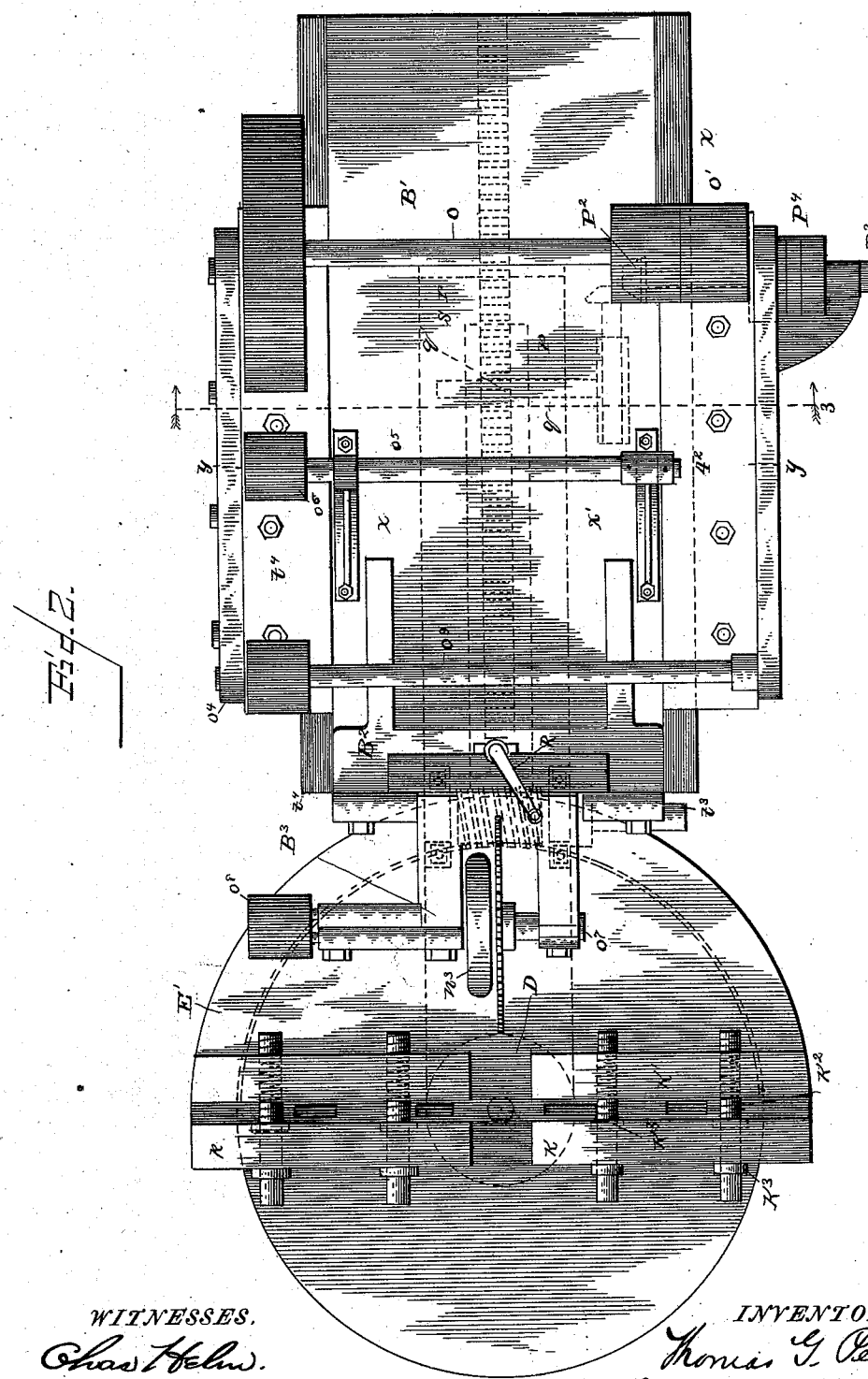
WITNESSES.
INVENTOR.

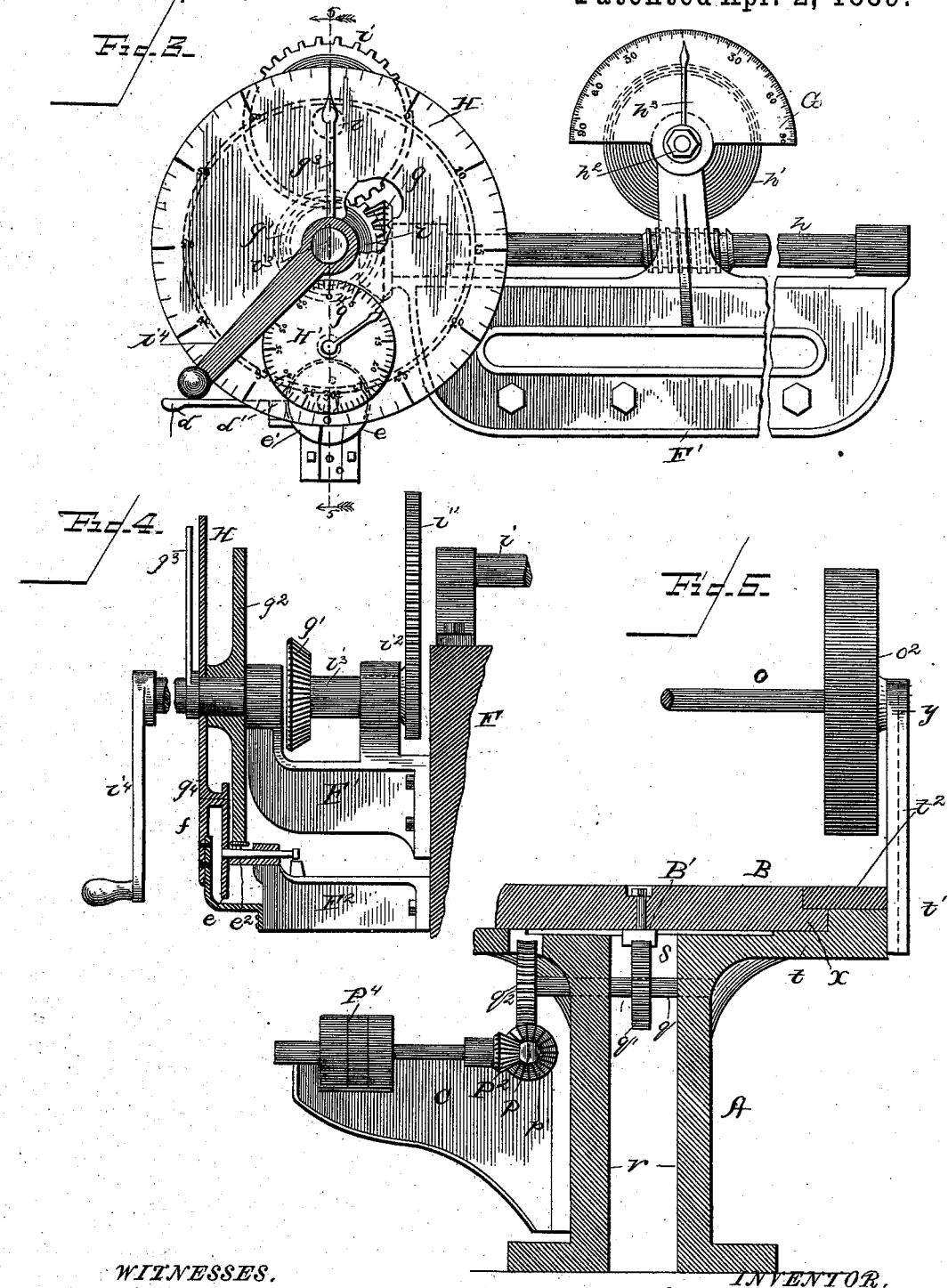

UNITED STATES PATENT OFFICE.

THOMAS G. PERKINS, OF CHICAGO, ASSIGNOR OF ONE-HALF TO E. C. READ, OF BLUE ISLAND, ILLINOIS.

MACHINE FOR CUTTING RAILS.

SPECIFICATION forming part of Letters Patent No. 400,707, dated April 2, 1889.

Application filed April 24, 1888. Serial No. 271,744. (No model.)

*To all whom it may concern:*

Be it known that I, THOMAS G. PERKINS, a citizen of the United States, residing at Chicago, in the county of Cook and State of Illinois, have invented a new and useful Improvement in Machines for Cutting Rails, of which the following is a specification.

My improvement relates more particularly to a machine for cutting railroad-rails on a bevel.

In providing for the crossings in railroads and for frogs, and for other constructions in which rails are required having beveled ends, the angle of the bevel in each instance has to be very accurate; and, as hitherto practiced, the work, owing to its exacting nature, has necessarily been intrusted to those possessing a high degree of skill and intelligence and experience. Thus, when an order for a crossing from the engineer of a road, or part thereof, in process of construction, specifies rails for a crossing beveled at an angle of so many degrees, minutes, and seconds, the work entails drawings based on accurate calculation consuming the time of a person sufficiently skilled to perform it, and the mechanic who performs the practical work of beveling the rails must be sufficiently skilled to understand and follow the drawings.

Hitherto the beveling of rails, as for the purposes named, has been commonly preceded by breaking them straight across into sections of desired length or lengths and then cutting the ends requiring to be beveled at the desired specified angles. Besides being a difficult and inaccurate mode of procedure, this method necessarily involves a waste of a considerable amount of the material of which the rails are composed, (steel,) since to produce the bevel requires the removal of a triangular section, the amount of which depends, of course, principally, at least, on the degree of bevel. By preventing this waste and the necessity for employing skilled labor in beveling the rails, which are the principal objects of my invention, a saving so great is produced that to realize its extent would require consideration of the enormous quantity of this class of work performed each year.

My invention consists in a rail-cutting machine having a rotatory table for supporting a rail to be cut and for adjusting the rail to any position with reference to the cutter at which it may be cut at a desired angle.

My invention also consists in a rail-cutting machine having an adjustable support for the rail and an angle-indicating attachment; and it further consists in details of construction and combinations of parts.

In the drawings, Figure 1 shows my improved machine in side elevation, partly sectional. Fig. 2 is a plan view of the entire machine; Fig. 3, a broken section taken at about the line 3 3 in Fig. 2, and viewed in the direction of the arrows; Fig. 4, a view in side elevation, partly broken, of the angle-indicating attachment; and Fig. 5, a broken section taken on the line 5 5 of Fig. 4 and viewed in the direction of the arrows.

A is the bed of the machine, preferably of cast metal, and having the rear portion, $r$, which extends higher than the forward portion, $r'$, (see Fig. 1,) hollow between the sides, as shown in Fig. 3. The top of the part $r$ is expanded laterally and toward the rear end of the machine to form a table, $t$, provided with side flanges, $t'$, surmounted by gibs $t^2$, secured in place, and the table $t$ is provided at its center with a longitudinal slot, $s$, Fig. 3, leading into the space between the parts $r$ and $r'$. A rotary shaft, $q$, extends transversely into the bed near the rear end of the machine below the table $t$, through the space in the part $r$, and carries a ratchet-wheel, $q'$, in the said space, and the end of the shaft which extends beyond the side of the bed A carries a worm-wheel, $q^2$. A reciprocating bed, B, having tongues $x$ at its sides, surmounts the table $t$ and is confined by the gibs $t^2$, which extend over the tongues $x$.

On the under side of the table B, longitudinally thereof, is rigidly secured a rack, B', coincident with the slot $s$ and in mesh with the ratchet-wheel $q'$, whereby rotation of the shaft $q$ alternately in opposite directions reciprocates the table B.

C is a bracket secured to the side of the rear portion of the bed of the machine below the worm-wheel $q^2$, and carrying longitudinally on the machine a worm-shaft, $p$, the worm of which is in mesh with the worm-wheel $q^3$, and at the rear end of the shaft $p$ is a beveled gear-wheel, $p'$, in mesh with a beveled pinion, $p^2$, on the inner end of a rotary shaft, $p^3$, supported in the bracket C transversely of the rear portion of the bed of the machine and carrying a suitable belt-pulley, $p^4$. The parts $p$ to $p^4$, inclusive, constitute the feed-gear for the reciprocating table B, since by the rotation of the shaft $p^3$, as stated, and the engagement of the gears $p$ and $p'$ the ratchet-wheel $q^2$ is actuated to move the table B back and forth through the medium of the rack B′, and thereby the cutter, in the form of a circular saw, hereinafter described, is advanced toward and retracted from its work.

To opposite sides of the table $t$ are secured upright brackets or frames $y$, supporting between them, toward the rear end of the machine, a rotary driving-shaft, $o$, carrying a suitable belt-pulley, $o'$, Fig. 2, and a belt-wheel, $o^2$, and between the frames $y$, toward the forward end of the part $r$ of the machine, is supported a rotary shaft, $o^3$, carrying a pulley, $o^4$, in line with the wheel $o^2$. Another rotary shaft, $o^5$, carrying a belt-pulley, $o^6$, in line with the pulley $o^4$, is supported in brackets $x'$ on the reciprocating table B near opposite lateral edges thereof and between the shafts $o$ and $o^3$.

The forward end of the table B has an upright head, B², recessed on its front side, and having in the recess the base of a horizontal bracket, B³, held in place by suitable gibs, $t^3$, extending over the lateral edges of the bracket-base, which is vertically adjustable in its position by means of a screw, $n$, working in a nut, $n'$, on the rear side of the said base and operated by a crank, $n^2$. A rotary shaft, $o^7$, is supported in the bracket B³, and carries near one end, in line with the pulley $o^6$, a belt-pulley, $o^8$, and between the bracket-arms is a fly-wheel, $n^3$, and adjacent to the fly-wheel a circular saw, D, secured on the shaft $o^7$ to rotate with it. The saw D is rotated from the driving-shaft $o$ by an endless belt, $m$, Fig. 1, passed around the wheel $o^2$ and pulleys $o^4$, $o^6$, and $o^8$, as shown, whereby, when the reciprocating table B moves, the shaft $o^5$ and pulley $o^6$, which move with it between the shafts $o$ and $o^3$, compensate for the resultant lengthening and shortening of the belt between the compensator-shaft $o^5$ and saw-shaft $o^7$.

On the forward lower part, $r'$, of the bed A is a turn-table, E, in the form of a disk having ninety teeth on one-half of its periphery. An arbor, $l$, extends from the bottom of the bed A through the center of the turn-table, and is tapered downward at different angles at intervals, as shown, to insure accurate rotation on its own axis and consequent steadiness in the rotation of the turn-table. A semi-disk, E′, is firmly secured upon the turn-table to extend over a portion thereof and afford a guard to intercept the fine particles of metal produced by cutting the rails, as hereinafter described, and prevent the access of such particles to the adjacent gear mechanism and consequent clogging of the latter. The straight edge of the guard E′ is provided with flanges $k$, extending toward each other from the periphery of the semi-disk and forming bearings for horizontal screws $k^2$, extending through them and through suitable nuts, $k^3$, to render the screws stationary; and on the inner sides of the flanges $k$ on the guard are corresponding loose bars, $k'$, through which the screws extend, which bars $k'$ are moved back and forth with reference to the flanges $k$ by manipulating the screws. The flanges, blocks, and screws thus described form a clamp to hold a rail while it is being secured, and to this end the adjacent upper edges of the flanges and blocks may be provided with off-sets, as shown in Fig. 1, to afford a seat for the flange of the rail (the ordinary position of which while being cut is with the flange or base downward) or not, as shown in Fig. 2.

A rotary horizontal worm-shaft, $i$, is supported on the part $r'$ of the bed A of the machine transversely of the latter, adjacent to the part $r$ thereof, in position to cause the worm to mesh with the teeth on the periphery of the turn-table, and toward one end of the shaft $i$, which projects beyond a side of the part $r'$ of the machine-bed, is a cog-wheel, $i'$, in mesh with a cog-wheel, $i^2$, one-half the diameter of the cog-wheel $i$, and supported below the latter on a shaft, $i^3$, provided at its outer extremity, and a crank-handle, $i^4$.

The side of the bed A at which the shaft $i$ extends is provided in the casting with a rectangular "planing-strip," F, or plate in relief, forming the base of the indicator attachment, hereinafter described, and which is partly supported on a bracket, F′, secured to the planing-strip. A worm-shaft, $h$, is supported in the bracket F′ lengthwise of the latter, the worm engaging with a worm-wheel, $h'$, having three hundred and sixty teeth, and which is also supported on the bracket in vertical position upon an arbor, $h^2$, carrying a dial-finger, $h^3$, which moves about a protractor, G, having ninety degrees marked off on its face from each side of the zero-point and supported in front of the wheel $h'$. The end of the worm-shaft $h$ carries a miter-gear, $g$, which is in mesh with a similar gear, $g'$, on the shaft $i^3$, and the last-named shaft carries, between the miter-gear $g'$ and crank $i^4$, and to rotate with it, a ratchet-wheel, $g^2$, and a dial-finger, $g^3$, which moves around a stationary dial, H, having minutes marked off upon it, the dial H being supported, with its center surrounding the shaft $i^3$, from a bracket, $f^2$, below the bracket $f'$. The lower part of the dial H is marked with a circle, H′, having sixty seconds indicated upon its face, about which a dial-finger, $g^4$, is moved, being carried by an arbor, F, provided with a pinion, F′, on its inner end in mesh with a ratchet-wheel, $e$, on a rotary shaft, $e'$, supported in the bracket F², and carrying a pinion, $e^2$, in mesh with the wheel $g^2$. The inner or rear end of the shaft $e'$, which is movable longitudinally in its bearing, is engaged by a horizontally-movable lever, $d$, fulcrumed upon a standard, $d'$, and serving to bring the wheel $e$, by moving the shaft $e'$, in and out of engagement with the pinion $f'$, whereby the finger $g^4$ of the seconds-dial may be rendered operative or inoperative, as desired. The arrangement is such that one revolution of the shaft $i^3$ produces sixty revolutions of the dial-finger $g^4$ and moves the dial-finger $h^3$ one degree, whereby, also, the turn-table E is moved one degree or the extent of one-half of one of the ninety teeth therein, the object of the last-named number of teeth instead of one hundred and eighty being to make the teeth the larger and stronger.

When a rail is to be cut to a desired angle—say twenty degrees, nine minutes, and nineteen seconds—it is placed in the clamp on the guard E' with the fingers of all the dials pointing at zero, when the crank $i^4$ is turned twenty times, whereby the table E is turned and moves the rail to an angle of twenty degrees with reference to the saw, the twenty turns of the crank also causing the finger $h^3$ to be moved to point to twenty degrees on the protractor G. Further turning of the crank till the fingers $g^3$ and $g^4$ indicate slightly beyond nine minutes on the dial H and nineteen seconds on the dial H', and of course slightly moving the dial-finger $h^3$ so far beyond the twenty-degrees mark as will equal or indicate the additional nine minutes and nineteen seconds, moves the table E nine minutes and nineteen seconds beyond twenty degrees. If no seconds enter the angle indicated to be cut, the seconds-hand may be rendered inoperative by the means for the purpose described. Thus the rail may be presented to the saw at any predetermined angle, and the saw is advanced by the feed mechanism and cuts the rail on a bevel at the angle to which the rail is set, after which the reciprocating table B is retracted by ordinary means for the purpose. It will thus be seen that a rail may be cut to any desired angle by simply turning the crank $i^4$ until the indicating mechanism shows the angle at which the same movement of the crank has turned the table E to present the rail to the saw.

The means for raising and lowering the bracket $B^3$, carrying the saw, permits cutting of a rail to any desired depth.

What I claim as new, and desire to secure by Letters Patent, is—

1. The combination, in a rail-cutting machine, of a rotary cutter, a horizontally-reciprocating table carrying at one end the rotary cutter, and a stationary turn-table at one end of the machine provided with means for supporting a rail thereon, and serving to permit setting of the supported rail to any angle in the horizontal plane with reference to the vertical plane of the rotary cutter, substantially as described.

2. The combination, in a rail-cutting machine, of a rotary cutter, a horizontally-reciprocating table carrying at one end the rotary cutter, an adjustable stationary support for the rail toward the end of the forward stroke of the reciprocating table, and an angle-indicating attachment, substantially as and for the purpose set forth.

3. The combination, in a rail-cutting machine, of a rotary cutter, a horizontally-reciprocating table carrying at one end the rotary cutter, a stationary turn-table at one end of the machine, and provided with means for supporting a rail thereon, and serving to permit setting of the supported rail to any angle in the horizontal plane with reference to the vertical plane of the rotary cutter, and an angle-indicating attachment geared to the turn-table and operated by the rotation thereof, substantially as described.

4. In a rail-cutting machine, in combination with the bed A, a reciprocating table, B, carrying a saw, D, a rack, B', on the table B, a shaft, $q$, provided with a cog-wheel, $q'$, in mesh with the rack and with a worm-wheel, $q^2$, a worm-shaft, $p$, having its worm in mesh with the wheel $q^2$, and a driving-shaft, $p^3$, geared to the shaft $p$, substantially as described.

5. In a rail-cutting machine, in combination with the bed A, a reciprocating table, B, carrying a saw, D, vertically adjustable on its support, substantially as described.

6. In a rail-cutting machine, in combination with the bed A, a reciprocating table, B, carrying a saw, D, a driving-shaft, $o$, supported on the bed and connected with the saw-shaft by an endless belt, and a compensator for the endless belt on the table B, substantially as described.

7. In a rail-cutting machine, in combination with the bed A, a reciprocating table, B, carrying a saw, D, on a rotary shaft, $o^7$, brackets $y$ on the bed supporting rotary shafts $o$ and $o^3$, a rotary shaft, $o^5$, supported on the table B, and an endless belt, $m$, connecting the shaft $o$ and saw-shaft, and passing over the intermediate shafts, $o^3$ and $o^5$, to form a compensator, substantially as described.

8. In a rail-cutting machine, in combination with the bed, a reciprocating table, B, carrying a saw, D, and a turn-table, E, adjacent to the saw, and provided with means for holding the rail to be cut, substantially as described.

9. In a rail-cutting machine, in combination with the bed, a reciprocating table, B, carrying a saw, D, a turn-table, E, adjacent to the saw, and a guard, E', upon the turn-table, provided with a clamp for holding a rail to be cut, substantially as described.

10. In a rail-cutting machine, in combination with the bed, a saw, D, a turn-table, E, having teeth on its periphery, a worm-shaft, $i$, in mesh with the teeth of the turn-table and carrying a cog-wheel, $i'$, a rotary shaft, $i^3$, carrying a cog-wheel, $i^2$, in mesh with the wheel $i'$, and a protractor, G, having a dial-finger, $h^3$, connected by suitable gearing with the shaft $i^3$, whereby rotation of the said shaft turns the table E and the dial-finger to indicate upon the protractor the angle to which the table E is turned, substantially as described.

11. In a rail-cutting machine, in combination with the bed, a saw, D, a turn-table, E, having teeth on its periphery, a worm-shaft, $i$, in mesh with the teeth of the turn-table and carrying a cog-wheel, $i'$, a rotary shaft, $i^3$, carrying a cog-wheel, $i^2$, in mesh with the wheel $i'$, a miter-gear, $g'$, and a dial-finger, $g^3$, a stationary dial, H, surrounding the shaft $i^3$, a worm-shaft, $h$, carrying a miter-gear, $g$, in mesh with the miter-gear $g^3$, a rotary worm-wheel, $h'$, in mesh with the worm on the shaft $h$ and on an arbor, $h^2$, carrying a dial-finger, $h^3$, and a protractor, G, supported adjacent to the dial-finger $h^3$, substantially as and for the purpose set forth.

12. In a rail-cutting machine, in combination with the bed, a saw, D, a turn-table, E, having teeth on its periphery, a worm-shaft, $i$, in mesh with the teeth of the turn-table and carrying a cog-wheel, $i'$, a rotary shaft, $i^3$, carrying a cog-wheel, $i^2$, in mesh with the wheel $i'$, a miter-gear, $g'$, a cog-wheel, $g^2$, and a dial-finger, $g^3$, a stationary minute-dial, H, surrounding the shaft $i^3$ and having a seconds-dial, H', marked upon it, a shaft, $e'$, carrying a pinion, $e^2$, in mesh with the wheel $g^2$ and a cog-wheel, $e$, an arbor, $f$, carrying a dial-finger, $g^4$, for the dial H', and a pinion, $f'$, in mesh with the cog-wheel $e$, a worm-shaft, $h$, carrying a miter-gear, $g$, in mesh with the miter-gear $g^3$, a rotary worm-wheel, $h'$, in mesh with the worm on the shaft $h$ and on an arbor, $h^2$, carrying a dial-finger, $h^3$, and a protractor, G, supported adjacent to the dial-finger $h^3$, substantially as and for the purpose set forth.

THOMAS G. PERKINS.

In presence of—
J. W. DYRENFORTH,
M. J. BOWERS.